INVENTOR.
DONALD C. ERDMAN
BY
ATTORNEY

United States Patent Office 3,005,335
Patented Oct. 24, 1961

3,005,335
ULTRASONIC NONDESTRUCTIVE TESTING APPARATUS AND CONTROL THEREFOR
Donald C. Erdman, Pasadena, Calif., assignor to Electrocircuits Incorporated, Pasadena, Calif., a corporation of California
Filed May 1, 1957, Ser. No. 656,252
7 Claims. (Cl. 73—67.8)

This invention relates to ultrasonic nondestructive testing apparatus, and, more particularly, to ultrasonic apparatus which may be used in the nondestructive testing of materials to detect hidden flaws, measure thicknesses of materials, and the like, wherein propagation time of ultrasonic waves is measured.

The invention presents various control arrangements for improving the indications or displays produced by apparatus for determining the propagation time along a predetermined path.

The purpose of my invention is to provide a visual indication of any flaws or defects that might be present in an object under test even though the defects are located beneath the exterior surface portion of the object and are not normally visible.

A further object is to provide such visual indication in a nondestructive manner so that the object being tested is not affected in any way.

In accordance with the arrangement of the present invention, a variable voltage source is employed to produce a range sweep signal in the form of voltage excursions which change in a predetermined manner with respect to time. By way of example, the range sweep signals may have a wave form of saw-tooth shape. Alternate electrical signals are generated each having a frequency which varies continuously and cyclically over a determined offset range of frequencies. These electrical signals when applied to a transducer provide a plurality of ultrasonic waves which are transmitted during each range sweep. The frequency of the ultrasonic waves corresponding to the electrical signals varies continuously and cyclically over a determined range of frequency which may vary from a minimum rate to a maximum rate or vice versa. The echo signals which are produced by the transmitted signals and reflected by the object and defects therein are detected and mixed with the electrical signal then being generated. This produces video signals which represent the time of occurrence of the echo signals which are detected. The video signal is combined with the range sweep signal to produce a control signal having a slope which varies in accordance with the slope of the voltage excursions of the range sweep signal during periods of time when no video signals occur and having a slope which is reduced during the periods of time when video signals do occur. This control signal may be employed in various manners to improve the indications or displays which are produced by the apparatus.

An advantage of the present invention is to provide novel means for improving the resolution of images which are produced on the cathode-ray tube by the ultrasonic apparatus.

Another advantage of the invention is the inclusion of an addition circuit whereby the variable voltage source is combined with an output signal from the video amplifier to improve the resolution of the display.

The present invention contemplates novel apparatus for the nondestructive testing of materials and includes various arrangements of combining, by means of an addition circuit, the output of the video amplifier with the output of a variable voltage source to squeeze or compress the signal display for improving the resolution thereof.

The foregoing and other objects and advantages of the invention will appear more fully hereinafter from a consideration of the detailed description which follows, taken together with the accompanying sheets of drawings wherein several embodiments of the invention are illustrated by way of example. It is to be expressly understood, however, that the drawings are for the purpose of illustration and description only and are not intended as a definition of the limits of the invention.

Figure 1:
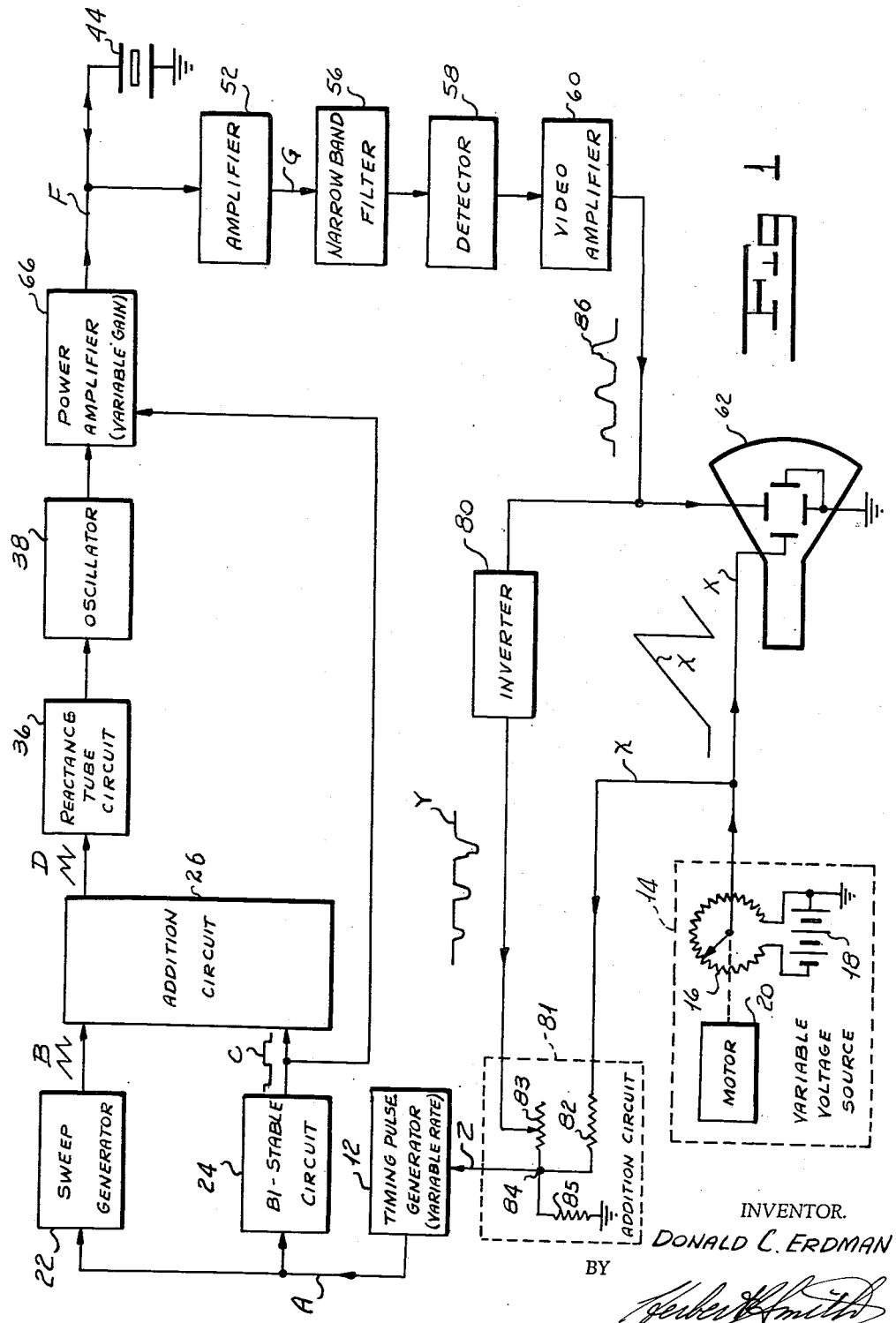
FIG. 1 illustrates an embodiment of the invention wherein the control signal is employed to cause the range sweep of ultrasonic apparatus to have two speeds.
Figure 2:
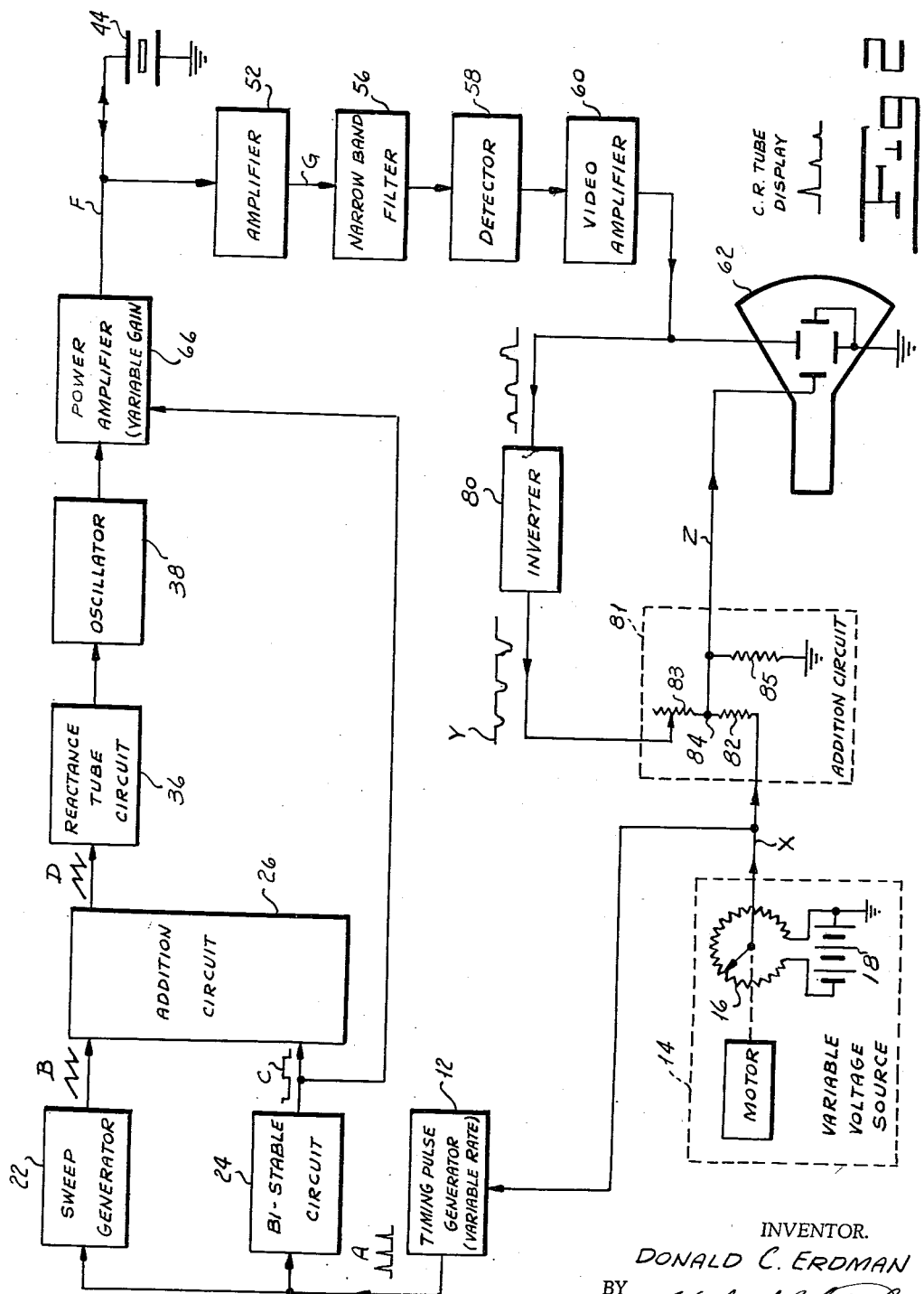
FIG. 2 illustrates an embodiment of the invention wherein the control signal is employed to compress or squeeze the respective video signals which are detected as a result of echos produced by a target.
Figure 3:
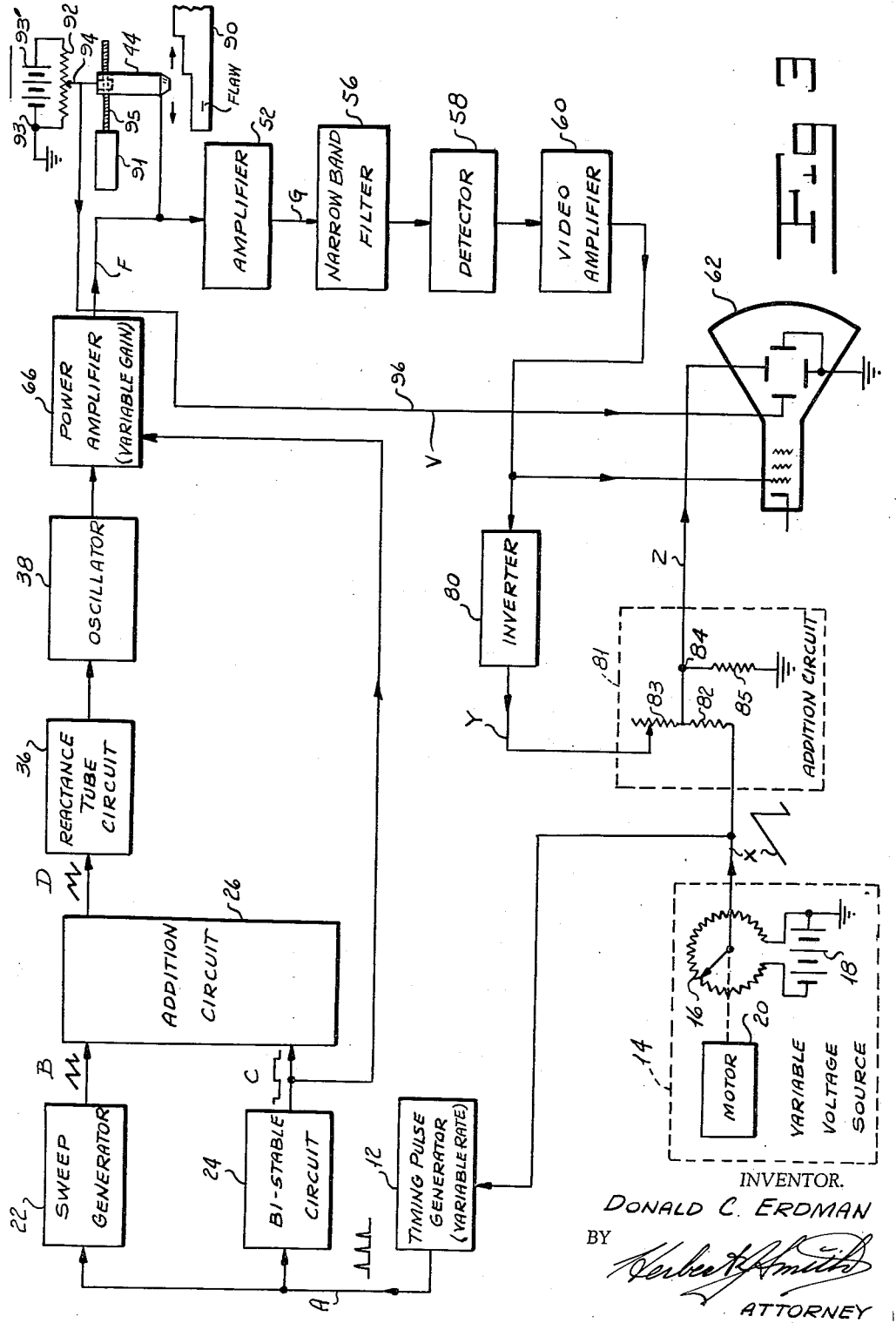
FIG. 3 illustrates a modification of the control arrangement of FIG. 2 for use with B-type scan displays.

Referring to the drawings, and, more particularly, to FIGS. 1, 2 and 3, there are shown combination block and schematic diagrams of the general type shown in my copending and continuation-in-part patent application Serial No. 522,542, filed July 18, 1955 for "Methods and Apparatus for Measuring Wave Propagation Time," now U.S. Patent 2,931,978, the inventor and assignee of said copending patent application being the same as the inventor and assignee of the instant application.

In FIG. 1 there is shown a timing pulse generator 12, which provides a series of equally spaced pulses A (see wave forms in FIG. 4) which control the sequence of operations in the apparatus. The timing pulse generator is a variable repetition rate type and the rate or periodicity of the pulses is controlled by the voltage which is produced by variable voltage source 14. The variable voltage source 14 may comprise a potentiometer 16 which is connected across a source of potential 18 and which is driven by a motor 20, or it may be a conventional electronic sweep generator which provides periodic voltage exercursions.

The timing pulses A are applied to a sweep generator 22 and to a bi-stable circuit 24. The sweep generator produces voltage excursions B (see FIG. 4) having sawtooth wave form in synchronism with the timing pulses A. The bi-stable circuit produces signals C (see FIG. 4) of rectangular wave form in synchronism with the voltage excursions B.

The saw-tooth signals B and the rectangular signals C are applied to a gated addition circuit 26 where they are summed to provide an output signal D (see FIG. 4) of saw-tooth wave form wherein the adjacent voltage excursions start from and follow different voltage levels. The addition circuit is provided with any variable conventional means, such as a pair of potentiometers for adjusting the slopes of the respective voltage excursions and may be associated with other apparatus, such as a pair of potentiometers, for adjusting the amount of offset in the voltage excursions. While any suitable or conventional apparatus may be used for this addition circuit, the potentiometers of the addition circuit 26 may be employed as specifically set forth in the aforementioned copending patent application.

The output signal of addition circuit 26 is applied to a reactance tube circuit 36. The output of the reactance tube circuit is applied to an oscillator 38 and it serves to cause the oscillator to produce the waves which occur in time sequence and which have frequencies which vary or sweep periodically in the same manner in synchronism with the voltage excursions of the signals D which are produced by the addition circuit. The second wave (in time) is offset in frequency from the first wave an amount which is proportional to the offset in the voltage excursions D. The output signals of the oscillator are applied through a power amplifier 66 which is a variable gain so that a signal having the general wave form of F (FIG. 4) is connected to a crystal or other transducer 44, which serves to transmit and receive ultrasonic signals, with said crystal being connected to ground in the conventional manner as shown by symbol. As illustrated in the wave form F of FIG. 4, the amplitude of the signal which is conveyed through the power amplifier 66 is reduced during alternate cycles of operation, and the wave of reduced amplitude is mixed with the echo signals in the amplifier 52 to provide heterodyne signals.

In conventional practice, the transducer has a portion thereof immersed in liquid which serves to convey the ultrasonic waves with much greater efficiency than would be possible in the air. The output of the power amplifier 66 is fed into transducer 44 and simultaneously into the amplifier 52. The echo signals which are received by the transducer 44 are also fed into the amplifier 52. The output of the amplifier 52 has a wave form G (see FIG. 4) which is fed through a narrow band filter 56, thence through a detector 58, and a video amplifier 60.

The narrow band filter 56 may be arranged to pass heterodyne signals having any desired frequency. By way of example, the filter 56 may be tuned to pass signals having a frequency of 455 kilocycles. Such filters are readily available because they are conventional types.

The detected signal is amplified by a video amplifier 60 and applied to one set of the deflection plates of a cathode-ray tube represented as an indicator 62. The variable voltage which is produced by the source 14 is applied to the other set of the deflection plates of the cathode-ray tube or indicator 62. Such a deflection arrangement provides an A-type scan so that the location of the detected signal along the horizontal axis of the cathode-ray tube provides a measure of the distance to the target.

In the operation of the circuit thus described frequency modulated electrical signals are produced and applied to the transducer. These frequency modulated signals vary uniformly and cyclically in frequency in accordance with the wave shapes set forth in wave representation F in FIG. 4. To produce such frequency modulated signals the entire apparatus is synchronized with the output of the variable voltage source 14. The timing pulse generator 12 which is synchonized by the variable voltage source produces a series of synchonized pulses occurring at a particular repetition rate as shown in wave representation A of FIG. 4.

Figure 4:
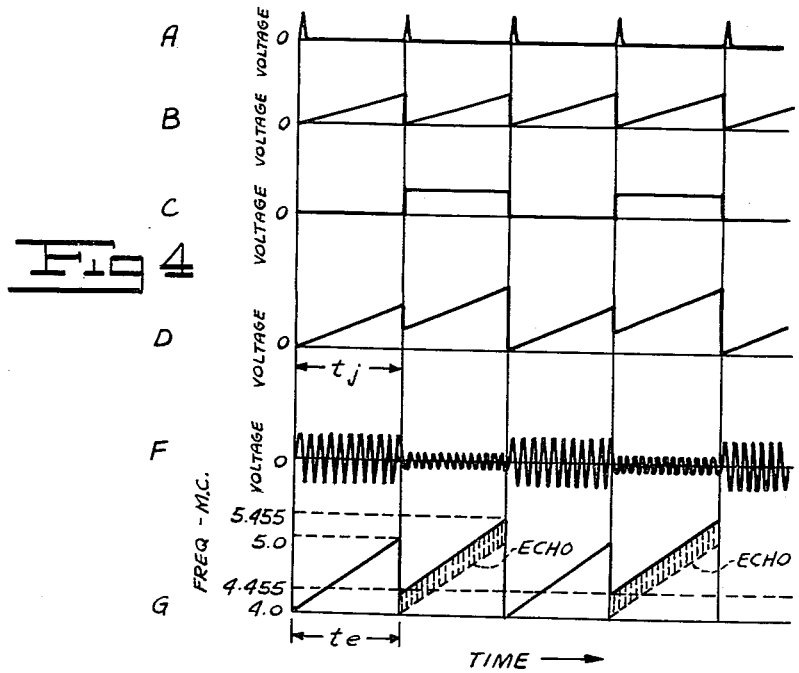
FIG. 4 illustrates the wave forms of signals which are produced in the apparatus of FIGS. 1 to 4.

In a conventional manner these impulses operate a multivibrator 24 and a sweep generator 22, the outputs of which in turn are added in the addition circuit 26 to produce the wave shape D of FIG. 4. These varying voltages are applied to the reaction tube circuit 36 and oscillator 38 which in turn produces a signal which varies in frequency proportional to the variation of the voltage input.

Therefore, the frequency modulated wave shape F occurring in the time portion $T_e$ of FIG. 4 is applied to the transducer which in turn produces proportional ultrasonic waves of uniformly and periodically varying frequencies which are transmitted into the object under test. In the illustrated example shown in FIG. 4 this frequency modulated wave varies in frequency from 4.0 megacycles to 5.0 megacycles.

In the next time portion in FIG. 4 the alternate frequency modulated signal that is produced varies in frequency from 4.455 megacycles to 5.455 megacycles. These above-described variations in frequency are repeated periodically.

It should be noted that the last mentioned alternate frequency modulated wave occurs at a much smaller amplitude than the first mentioned. This is due to the connection between the bistable circuit 24 and the power amplifier 66. In operation this alternate signal which is of smaller amplitude is compared to any echo signals that are reflected back from points along the path of the signal transmitted during the time period $T_e$. Since the echo signals also have a smaller amplitude, the signals can be more properly compared.

When the signals reflected from a defect are applied to the amplifier 52 with a frequency that is different from the frequency then being supplied from the power amplifier 66 by a preselected amount the resultant difference signal will pass through the narrow band filter 56 which has a frequency response of the constant and preselected frequency difference.

Accordingly, by varying the rate of frequency change of the frequency modulated generator or by varying the frequency transmitted portion of the filter 56 it is possible to determine precisely the location of the defect.

It can accordingly be seen that it is not necessary to indicate a plurality of echoes simultaneously. If there is only one defect present one reflection will be indicated on the cathode ray tube.

The distance to the target is also indicated by the time between the pulses which are produced by the timing pulse generator at the instant when a signal appears on the screen of the cathode-ray tube. If desired, the signal which is produced by the variable voltage source 14 may be adjusted manually and the distance to the target may be ascertained by observing the manual setting of the voltage source when a signal is produced on the screen of the cathode-ray tube. However, it is preferable that the signal which is produced by the source 14 be varied cylically, as indicated in FIG. 1, so that plural reflecting surfaces may be indicated during each cycle of operation.

In FIG. 1 the output of the video amplifier 60, which is connected to one set of the deflection plates of the cathode-ray tube 62, is simultaneously connected through an inverter 80 and thence to a second addition circuit 81. The signal from the variable voltage source 14 which is fed to the other set of plates of the cathode-ray tube 62 is simultaneously connected to the addition circuit 81 via one end of a resistor 82. The output of the inverter 80 is connected via the variable resistor 83 to the terminal 84. A resistor 85 is connected via ground to the terminal 84 which in turn is connected to the input of the timing pulse generator 12.

Figure 5:
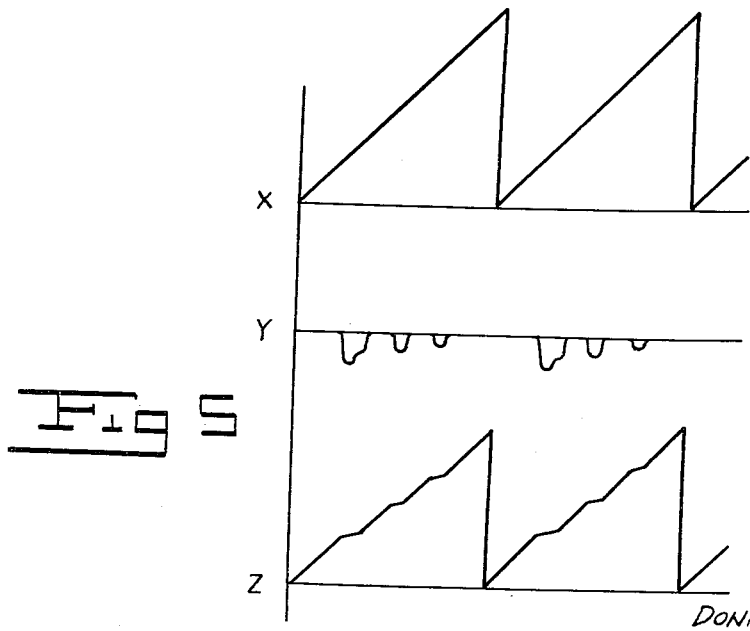
FIG. 5 illustrates the wave forms of the signals which are involved in the control arrangement which is the subject matter of this invention.

The wave form 86, representative of the output of video amplifier 60, is inverted in inverter 80 to produce the wave form Y. The wave form X is the range sweep signal and is combined with the signals Y to produce the control signals Z, which are fed via the addition ciricuit 81 into the timing pulse generator 12. Waveforms X, Y, and Z are shown represented in FIG. 5.

The control signals Z, in FIG. 1, are employed to control the repetition rate of the pulses A which are produced by the timing pulse generator 12. The signals Z cause the rate of change of the repetition rate of the pulses A to be reduced when video signals are received, thereby decreasing the range sweep rate when video signals are being received.

The wave form X is the range sweep signal, and it may be produced by a motor driven potentiometer as illustrated in the drawings. The signals Y are the video signals which are produced at the output of the ultrasonic apparatus and which represent echo information. The video signals Y are inverted so that they may be combined with the range sweep signals in an addition circuit to provide the difference between the instantaneous magnitudes of the signals X and Y. The difference between the signals X and Y is the signal Z having a slope which varies in accordance with the slope of the voltage excursions of the range sweep signal X during periods of time when no video signals occur, and having a slope which is reduced during periods of time when video signals do occur. The compressed or squeezed signals are represented in waveform on FIG. 2, adjacent the cathode-ray tube, bearing legend C. R. Tube display.

In FIG. 2, there are shown numerous blocks which are similar to those shown in FIG. 1, with the like blocks and parts having like reference numerals. The addition circuit 81 of FIG. 2 is similar to that shown in FIG. 1, but in FIG. 2 the output of the video amplifier 60 is fed simultaneously into the inverter 80 and to one of the vertical deflecting plates of the cathode-ray tube 62. The output of the inverter 80 is fed into the variable resistor 83, so that the inverter signal Y combines with the signal X and is fed into one of the horizontal deflecting plates of the cathode-ray tube 62. Further, the signal X from the variable voltage source 14 is also fed into the timing pulse generator 12, but directly, as distinguished from FIG. 1.

In FIG. 2 the control signals Z are applied to the horizontal deflecting circuit of the cathode-ray tube to cause the video signals which are displayed on A-Scan to be squeezed or confined to a smaller area. Squeezing of the video signals results because the waveform Z is applied to the horizontal deflecting plates of cathode ray tube 62. With no Z signal applied to the cathode ray tube 62 the spot corresponding to the electron beam of the cathode ray tube will be deflected from left to right, for example as a horizontal line, if no video signal is applied to the vertical deflecting plates. If the signal applied to the horizontal plates has an ordinary sawtooth waveform such as waveform X shown in FIG. 5 the spot is deflected across the screen at a constant rate. Therefore any video signal which is applied to the vertical plates would appear as a vertical deflection of the spot on the cathode ray tube. If a square wave signal were applied to the vertical plates for example, a square wave would appear on the cathode ray tube.

On the other hand the waveform Z applied to the horizontal plates provides a different presentation. As stated whenever a video signal is applied to the vertical deflecting plates of the cathode ray tube the slope of the signal Z is changed to decrease the sweep rate of the waveform X at this particular time. Therefore, if a square wave were presented the width of the square wave would appear to be much smaller than the width of the square wave with the ordinary sawtooth horizontal sweep voltage. With a lower sweep rate the electron beam will move from left to right more slowly and therefore the square wave will be presented on a much smaller portion of the horizontal sweep line and accordingly compressed.

In FIG. 3 there are shown numerous blocks which are similar to those shown in FIG. 1, with like blocks and parts having like reference numerals. The addition circuit 81 of FIG. 3 is similar to that shown in FIG. 1, but in FIG. 3 the output of the video amplifier 60 is fed simultaneously into the inverter 80 and to one of the control grids of the cathode-ray tube 62. The signals X and Y, which are combined in the addition circuit 81 provide signals Z which are fed into one of the vertical deflecting plates of the cathode-ray tube 62. The signal X is also fed into the timing pulse generator 12, as is shown in FIG. 2.

A stepped testing block 90 having a representative flaw therein is shown positioned below a transducer 44 which may be a crystal. A direct current source of energy 93' is connected in parallel with a variable resistor 92 having a terminal 93 connected to ground. A movable terminal 94, movable in relation to the variable resistor 92, moves in response to lateral movement of the transducer 44, as indicated by the arrows positioned immediately below the transducer 44. A motor 91, operable from a suitable control, has a lead screw 95 which is normally connected through a lead nut carried by the transducer 44, so that rotation of the motor 91, in either direction, will cause the lead screw to rotate in the proper direction and move the transducer laterally, accordingly. The signal F is connected to the transducer 44. The signal reflected from the object and received by the transducer 44 is connected to the amplifier 52.

As transducer 44 moves horizontally across the test block or test piece, a corresponding second range sweep signal V signal is attained from variable resistor 92, or on potentiometer, which signal synchronizes the horizontal movement of transducer 44 with the horizontal sweep appearing on cathode-ray tube 62.

In FIG. 3 the control signals Z are supplied to the vertical deflection circuit of the cathode-ray tube, causing the video signals which are displayed on B-Scan to be squeezed or compressed, thereby producing a sharper image of the object and flaws being scanned.

The well known B-scan is a two dimensional presentation of the object scanned. In practice the B-scan reveals defects in an object with respect to a top and bottom surface of the object along a scan length of the object. As the B-scan presentation is conventional it need not be described in detail.

In the operation of FIG. 3 the range signal X produced by the motor driven potentiometer 16 is combined with the inverted video signal Y to provide the range signal Z. The range signal Z is connected to the vertical deflection plates of cathode ray tube 62 to control the vertical presentation of the spot on the tube. In the conventional B-scan presentation this represents the Y axis or propagation time axis of the two coordinate presentation.

The signal reflected from the object and the then being transmitted signal F are detected and mixed and amplified in amplifier 52 and transformed into a video signal as previously described.

Simultaneously with the scanning operation the motor driven contact 94 moving over the resistor 92 produces the signal V in synchronization with the range sweep signals X. The signal V produced by the scanning mechanism is a range sweep signal representing the position of the transducer 44 as it scans the object 90.

The range sweep signal V is applied to the horizontal deflection electrode of the cathode ray tube 62 and corresponds to the X axis or scan length in the B-scan presentation.

As shown in FIG. 3 the output of video amplifier 60 is also applied to a control grid of the cathode ray tube 62. The video signal acts to bias the control grid with respect to the cathode of the cathode ray tube to provide conventional spot intensity modulation of the presentation shown on the tube. Thus when a video signal is produced it is not only compressed but employed to bias the control grid of the cathode ray tube 62 intensifying the spot presentation on the cathode ray tube 62. The combined compressing and spot intensity modulation provides a clear sharp B-scan presentation of high resolution.

From the foregoing it will be seen that there are presented three different arrangements employing the use of special control signals to improve the resolution of the images which produced on the cathode-ray tube by the ultrasonic apparatus. The invention may be employed with either A-Scan or B-Scan displays.

While several embodiments of the invention have been illustrated and described in detail, it is to be expressly understood that invention is not limited thereto. Various changes can be made in the design and arrangement of the parts without departing from the spirit and scope of the invention as will now be understood by those skilled in the art.

What is claimed is:

1. In an apparatus for determining the propagation time of an ultrasonic wave in traveling between a transducer transmitting said ultrasonic waves and an object reflecting said ultrasonic waves, the combination of variable signal means for generating a range sweep signal of uniformly and cyclically varying amplitude; circuit means responsive to said range sweep signal for transmitting one of a series of alternate electrical signals during each cycle of said range sweep signal, each of said series of electrical signals comprising a plurality of electrical signals of uniformly and cyclically varying frequencies, alternate electrical signals in said series of electrical signals varying through offset frequency ranges while maintaining a constant frequency difference between corresponding portions of said alternate electrical signals; transducer means connected to said circuit means for converting said series of transmitted electrical signals into a corresponding series of transmitted ultrasonic waves, said transducer means transmitting said series of ultrasonic waves toward said object and receiving said ultrasonic waves reflected from said object and converting said received ultrasonic waves into corresponding received electrical signals; means connected to said circuit means and said transducer means for mixing said received electrical signals with the electrical signals then being transmitted; means responsive to said mixing means for selecting and amplifying only a video signal of a frequency equal to the constant difference frequency between said alternate signals of said series of transmitted electrical signals whereby said selected video signal is a function of the propagation time of said ultrasonic waves in traveling between said transducer and the object from which reflected; addition means for receiving and combining said video signals and said range sweep signal to produce a control range sweep signal having a slope which corresponds to the slope of the range sweep signal when no video signals are present and a slope which is reduced during the time when a video signal is present; and cathode ray tube means including beam deflection means connected in circuit with said video signal means and said addition means to display video signals in time relationship with said control range sweep signal, said control range sweep signal being applied to said beam deflection control means whereby said video signal display on said cathode ray tube is compressed in time relationship with respect to said control range sweep signal.

2. The apparatus as defined in claim 1 wherein the cathode ray tube means includes horizontal and vertical deflection plates and said video signal is applied to the vertical deflection plates and said control range sweep signal is applied to said horizontal deflection plates causing the horizontal movement of the beam of the cathode ray means to be reduced in speed during the periods of time when the slope of the voltage excursions of the control range sweep signal is reduced to compress and intensify the video signal display with respect to said control range sweep signal.

3. In a nondestructive testing apparatus in which transmitted ultrasonic waves are reflected by an object and defects therein, said reflected ultrasonic waves indicating the presence of a reflective surface in said object and the propagation time of said ultrasonic waves in traveling between the points of transmission and reflection being a function of the depth of said reflective surface in said object, the combination of: means for generating a first series of sawtooth range sweep signals; circuit means responsive to said first series of range sweep signals for generating and transmitting a series of electrical signals of cyclical varying frequency, alternate electrical signals of said series of electrical signals being transmitted through one of said first series of range sweep signals and varying through a different frequency range providing a constant frequency difference between corresponding parts of adjacent signals in said series of electrical signals; transducer means responsive to said series of electrical signals for transmitting toward said object a series of ultrasonic waves corresponding to said series of transmitted electrical signals, said transducer receiving the ultrasonic waves reflected from said object and defects therein and converting said reflected and received ultrasonic waves into received electrical signals; scanning means for moving said transducer with respect to said object to scan said object with said transmitted ultrasonic waves and for generating a second series of sawtooth range sweep signals corresponding to the position of said transducer with respect to said object being scanned; means connected to said circuit means and said transducer means for mixing said received series of electrical signals with the electrical signals then being transmitted; means responsive to said mixing means for selecting and amplifying a video signal of a frequency equal to the constant frequency difference between said alternate electrical signals of said transmitted series of electrical signals whereby said video signal is a function of the propagation time of said ultrasonic waves in traveling between said transducer and said object and the defects therein from which reflected; addition means for receiving and combining said video signal and said first series of range sweep signals to produce a control range sweep signal having a slope corresponding to the slope of a first range sweep signal when no video signals are present and a slope which is reduced during the time when a video signal is present; and a cathode ray tube including horizontal and vertical deflection plates and a control grid connected in circuit with said video signal means, and said scanning means, said cathode ray tube for displaying said video signal in time relationship with said control range sweep signal and said second range sweep signal being connected to said horizontal deflection plates and said video signal being applied to said control grid whereby said video signal display on said cathode ray tube is compressed in time relationship with respect to said control range sweep signal, and said video signal applied to said control grid provides for intensity modulation of said video signal in time relationship with respect to said control and said second range sweep signals to intensify the display of said compressed video signal.

4. Apparatus as defined in claim 1, wherein the addition means comprises an impedance network.

5. Apparatus as defined in claim 4 in which the impedance network is a resistive network.

6. Apparatus as defined in claim 3 in which the addition means comprises an impedance network.

7. Apparatus as defined in claim 6 in which the impedance network is a resistive network.

References Cited in the file of this patent

UNITED STATES PATENTS

| | | |
|---|---|---|
| 2,368,448 | Cook | Jan. 30, 1945 |
| 2,375,709 | Thompson | May 8, 1945 |
| 2,402,270 | Altman | July 18, 1946 |
| 2,474,918 | Slaymaker | July 5, 1949 |
| 2,475,707 | Jeanne | July 12, 1949 |
| 2,593,865 | Erdman | Apr. 22, 1952 |
| 2,659,878 | Meeker | Nov. 17, 1953 |

FOREIGN PATENTS

| | | |
|---|---|---|
| 580,891 | Great Britain | Sept. 24, 1946 |